United States Patent [19]

Haydon

[11] Patent Number: 4,889,977

[45] Date of Patent: Dec. 26, 1989

[54] METHOD OF IDENTIFYING THE DISPOSITION OF PLUG-IN UNITS AT A WAREHOUSE

[75] Inventor: Robert Haydon, Little Rock, Ark.

[73] Assignee: Southwestern Bell Telephone Company, Little Rock, Ark.

[21] Appl. No.: 135,719

[22] Filed: Dec. 21, 1987

[51] Int. Cl.[4] .......................... G06F 15/20; G06F 15/24
[52] U.S. Cl. ..................................... 235/375; 235/376; 235/385; 235/462; 235/472
[58] Field of Search ................. 209/3.1, 3.3, 546, 549; 235/375, 376, 377, 383, 385, 462, 472; 340/321, 635; 364/401, 403; 379/1, 32, 457

[56] References Cited

U.S. PATENT DOCUMENTS

| | | | |
|---|---|---|---|
| B 477,892 | 3/1977 | Roehrman et al. | 235/462 |
| 4,138,599 | 2/1979 | Munter | 379/1 X |
| 4,377,741 | 3/1983 | Brekka et al. | 235/472 |
| 4,454,413 | 6/1984 | Morton, Jr. | 235/375 |
| 4,521,677 | 6/1985 | Sarwin | 235/472 X |
| 4,533,823 | 8/1985 | Vittorio | 235/375 |
| 4,593,186 | 6/1986 | Swartz et al. | 235/472 |
| 4,652,734 | 3/1987 | Hubel | 235/472 |
| 4,654,514 | 3/1987 | Watson et al. | 235/472 |

Primary Examiner—Johnny D. Cherry
Assistant Examiner—Edward M. Wacyra
Attorney, Agent, or Firm—Senniger, Powers, Leavitt and Roedel

[57] ABSTRACT

A method of identifying the disposition of portable modular plug-in units (11) of telecommunications equipment. A bar code (15) is first placed on each plug-in unit (11). A scanner (21) or a personal computer (25) is then programmed to identify which plug-in units (11) are to be scrapped, which are to be modified, which are to be tested, and which require no action. Each bar code (15) is scanned with a scanning wand (17) and then the scanner (21) or computer (25) is read to determine what action to take regarding each plug-in unit (11).

2 Claims, 1 Drawing Sheet

METHOD OF IDENTIFYING THE DISPOSITION OF PLUG-IN UNITS AT A WAREHOUSE

TECHNICAL FIELD

This invention relates in general to methods for identifying the status of items. In particular, the invention relates to a method of identifying the status or disposition of portable modular units of telecommunications equipment, commonly called plug-ins or plug-in units.

BACKGROUND AND SUMMARY OF THE INVENTION

Telephone transmission and switching networks generally include portable modular units, commonly called plug-ins or plug-in units. The plug-in units are inserted into receptacles in prewired metal frameworks called hardwired equipment. Activated plug-ins form the brains of the network.

In order to facilitate inventory of plug-in units, a bar code is placed on each unit. These bar codes can be read by a scanner, which then inputs the location of the plug-in unit into a computer.

Plug-in units are manufactured by a variety of companies. Occasionally, the manufacturer will discover a problem with a particular lot of plug-in units. The manufacturers will usually send customer change notices to all of the companies which own plug-in units from that particular lot. The manufacturers commonly offer to repair the affected units free of charge, but only if the unit is returned to the manufacturer within a stated time period, commonly one or two years. After the expiration of the time period, the manufacturer will usually charge for repair of the unit.

Telephone companies which receive notice of defective plug-in units have a difficult time reacting to the notices within the stated time period. It is difficult for a user company to search through all of its plug-in units to locate the units listed in the notice from the manufacturer. Failure to find the units not only voids the warranty period, but also leaves malfunctioning equipment in service.

A related problem is identifying the disposition of plug-in units as they are returned to a warehouse location. Some units are to be junked, some units are to be tested, some are to be modified, and some are merely stored for future use. Warehouse personnel are instructed as to the disposition of each unit by means of a written list. This method is difficult and inaccurate, and substantially delays the disposition of the various plug-in units. Therefore, the purpose of the method of this invention is to facilitate the sorting of plug-in units.

The method of the invention is a method of identifying the disposition of plug-in units. A bar code is place on each plug-in unit. Then, a scanner is programmed to identify which plug-in units are to be scrapped, which are to be modified, which are to be tested, and which require no further action.

As the plug-ins are brought into the warehouse area, each bar code is scanned with a scanning wand attached to the scanner. The scanner is then read to determine what action is to be taken regarding each particular plug-in unit.

DESCRIPTION OF THE DRAWINGS

A more complete understanding of the invention may be had by reference to the following Detailed Description when taken in conjunction with the accompanying drawings wherein.

DETAILED DESCRIPTION

Figure 2:
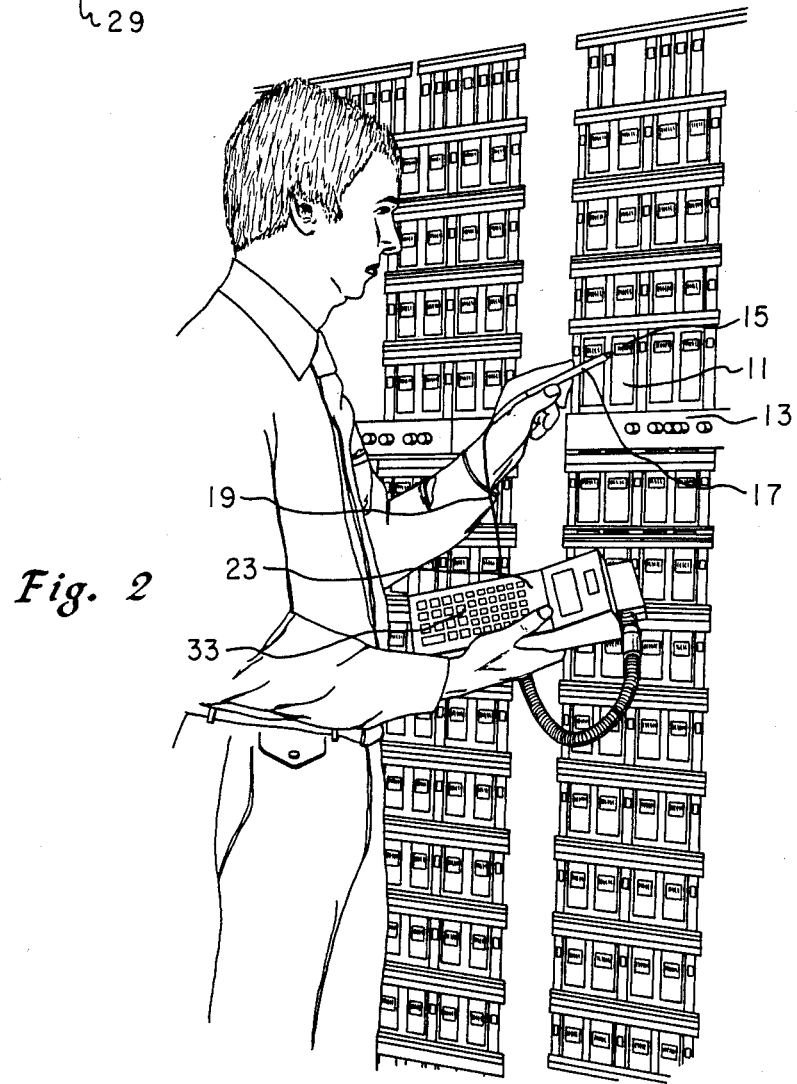
FIG. 2 shows a scanning wand and a portable scanner being used to scan the bar codes on a group of plug-in units.

The method of the invention is for sorting plug-in units 11, as shown in FIG. 2. In use, the plug-in units 11 are installed in a prewired metal framework, called hardwired equipment 13.

On occasion, the plug-in units 11 may be unplugged from the hardwired equipment 13 and returned to a warehouse location. At the warehouse the plug-ins are sorted into several groups. One group includes plug-ins 11 that are obsolete or surplus, and these units are scrapped. A second group includes plug-ins 11 that came from lots which a customer change notice has been received. Other plug-ins 11 may be set aside for testing, and the remaining units 11 may be stored without any other action being required.

Figure 1:
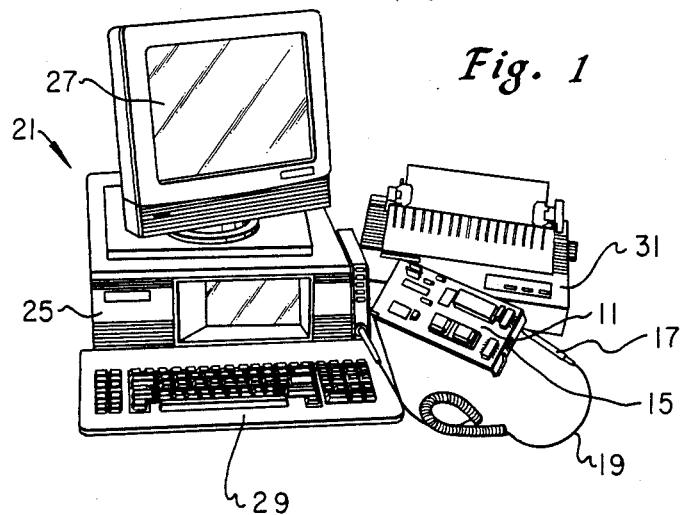
FIG. 1 shows a scanning wand connected to a personal computer.

Each plug-in unit 11 bears a bar code 15. These bar codes 15 may be read with a scanning wand 17. The scanning wand 17 is connected by a wire 19 to a personal computer 21, as shown in FIG. 1, or to a scanner 23, as shown in FIG. 2. The personal computer 21 may be used in a permanent location, such as in a central warehouse. The portable scanner 23 may be used to identify the disposition or status of plug-in units 11 that are still plugged into hardwired equipment 13.

The personal computer 21 may consist of a central processing unit 25, a monitor 27, a keyboard 29, and a printer 31. Data may be input into the computer 21 by means of the keyboard 29. The data in the computer 21 may be displayed on the monitor 27 or printed out on the printer 31.

The scanner 23 is hand-held and portable. The scanner 23 is programmable and has a considerable amount of memory storage capability. The scanner 23 is programmed directly by pressing buttons 33 which are located on the scanner 23 or by a downloading process from a computer into the hand-held scanner.

Therefore, data concerning the desired disposition of each plug-in unit 11 may be input into the scanner 23 or the computer 21. Such data may include which plug-in units 11 are to be scrapped, which are to be modified, which are to be tested, and which require no action. This data may be input by the keyboard 29 into the computer 25 or into the scanner 23 with the buttons 33.

As the plug-in units 11 enter the warehouse, each bar code 15 is scanned with the scanning wand 17. The computer 21 or the scanner 23 will then indicate to the operator which disposition is intended for the plug-in unit 11. The operator can read the computer 21 or the scanner 23 to determine what action to take regarding each plug-in unit 11.

Only the two most preferred embodiments of the invention have been described. It should be apparent to the person skilled in the art that various modifications may be made in the method of the invention without departing from the scope of the claims.

I claim:

1. A method of identifying the disposition of portable modular plug-in units of telecommunications equipment, the method comprising the steps of:

placing a bar code on each plug-in unit identifying that unit;

installing said plug-in units in telecommunications equipment;

removing at least some of the plug-in units from the telecommunications equipment and transporting the removed plug-in units to a warehouse or the like;

storing data in a scanner to identify which of the removed plug-in units are to be scrapped, which are to be modified, which are to be tested, and which require no action;

at said warehouse or the like, scanning the bar code of each of said removed plug-in units with a scanning wand attached to the scanner to identify that unit; and comparing said stored data with the identity of each removed plug-in unit as read by the scanner to determine what action to take regarding the removed plug-in unit.

2. A method of identifying the disposition of portable modular plug-in units of telecommunications equipment, the method comprising the steps of:

placing a bar code on each plug-in unit identifying that unit;

installing said plug-in units in telecommunications equipment;

removing at least some of the plug-in units from the telecommunications equipment and transporting the removed plug-in units to a warehouse or the like;

inputting data into a computer as to which plug-in units are to be scrapped, which are to be modified, which are to be tested, and which require no action;

down loading data from the computer into a scanner;

at said warehouse or the like, scanning the bar code of each of said removed plug-in units with a scanning wand attached to the scanner to identify that unit; and comparing the stored data with the identity of each removed plug-in unit as read by the scanner to determine the desired disposition of each plug-in unit.

* * * * *